(12) United States Patent
Conus et al.

(10) Patent No.: US 8,646,097 B2
(45) Date of Patent: Feb. 4, 2014

(54) SECURITY MODULE FOR AUDIO/VIDEO DATA PROCESSING UNIT

(75) Inventors: Joel Conus, Essertines-sur-Yverdon (CH); Luca Gradassi, Prilly (CH); Rached Ksontini, Pully (CH); Henri Kudelski, Chexbres (CH)

(73) Assignee: Nagravision, S.A., Cheseaux-sur-Lausanne (CH)

( * ) Notice: Subject to any disclaimer, the term of this patent is extended or adjusted under 35 U.S.C. 154(b) by 627 days.

(21) Appl. No.: 12/383,787

(22) Filed: Mar. 27, 2009

(65) Prior Publication Data

US 2009/0254996 A1    Oct. 8, 2009

(30) Foreign Application Priority Data

Apr. 3, 2008   (EP) ..................................... 08154029

(51) Int. Cl.
*G06F 17/30* (2006.01)
(52) U.S. Cl.
USPC ............... 726/27; 726/30; 713/189; 713/190; 705/50; 705/51; 705/55; 380/210; 380/239
(58) Field of Classification Search
USPC ............ 380/210, 229; 726/27–30; 705/50–59
See application file for complete search history.

(56) References Cited

U.S. PATENT DOCUMENTS

| | | | |
|---|---|---|---|
| 6,697,489 B1 | 2/2004 | Candelore | |
| 7,096,355 B1* | 8/2006 | Marvit et al. | 713/162 |
| 7,302,058 B2* | 11/2007 | Candelore | 380/200 |
| 2003/0174844 A1* | 9/2003 | Candelore | 380/277 |
| 2004/0151314 A1 | 8/2004 | Candelore | |
| 2004/0236956 A1* | 11/2004 | Shen et al. | 713/193 |
| 2006/0059508 A1* | 3/2006 | Kamperman et al. | 725/31 |
| 2006/0126836 A1 | 6/2006 | Rivas | |
| 2006/0285686 A1* | 12/2006 | Van Den Heuvel et al. | 380/200 |
| 2007/0286422 A1* | 12/2007 | Cocchi et al. | 380/239 |
| 2008/0301461 A1* | 12/2008 | Coulier et al. | 713/184 |

FOREIGN PATENT DOCUMENTS

| | | |
|---|---|---|
| WO | WO 00/59222 | 10/2000 |
| WO | WO 2004/008765 | 1/2004 |
| WO | 2004057830 A1 | 7/2004 |
| WO | WO 2004/057830 | 7/2004 |
| WO | WO 2004/082147 | 9/2004 |

OTHER PUBLICATIONS

Guillou et al, "Encipherment and Conditional Access", SMPTE Journal,, vol. 103, No. 6, Jun. 1994.

(Continued)

*Primary Examiner* — Mamon Obeid
(74) *Attorney, Agent, or Firm* — Stuart J. Friedman

(57) ABSTRACT

The aim of the present invention is to limit the impact of security breaches, which are the emulators of the security module. This aim is reached by a processing unit of audio/video digital conditional access data, encrypted by control words, responsible for processing security messages containing at least one cryptogram relative to a control word and one instruction relative to the control word, characterized in that it includes means to receive at least two micro programs by security messages, executable by the security module, said security module comprising means to store at least two micro programs and means to receive an instruction contained in the security message, for selecting the micro program indicated by the instruction, for executing the said micro program with at least the cryptogram as a parameter of execution, this execution allowing the calculation of the control word to be sent back to the audio/video processing unit.

10 Claims, 5 Drawing Sheets

(56) References Cited

OTHER PUBLICATIONS

EBU Project Group, "Functional Model of a Conditional Access System", EBU Review Technical, No. 266, Winter, 1995.
McCormac, European Scrambling Systems, 1996, pp. 6-44, 6-45, 7-46, 7-47.
Markus Kuhn, Some technical details about Videocrypt, 1996 http://www.cl.cam.ac.uk/~tv-crypt/details.txt).
Markus Kuhn, Season7-Version 1.3, 1994 (http://www.cl.cam.ac.uk/~crypt/season13.zip).
Markus Kuhn, Attacks on pay—TV access control systems. Security Seminar talk, 1997 (http://www.cl.cam.ac.uk/~mg25/vc-slides.pdf2).
Markus Kuhn, TV-Crypt Terminology and Introductory Literature, 1999 (http://www.cl.cam.ac.uk/~mgk25/tv-crypt/terminology.txt).

* cited by examiner

SECURITY MODULE FOR AUDIO/VIDEO DATA PROCESSING UNIT

INTRODUCTION

The present invention relates to the field of the protection of conditional access audio/video data and in particular to the security mechanisms executed in a security module.

PRIOR ART

Audio/video data protection is well known and has been the object of several publications among which the "Functional Model of a Conditional Access System", EBU technical Review, Winter 1995.

In a well-known embodiment, several streams are broadcast towards a multimedia unit, for instance a decoder in order to be able to view a Pay-TV event, such as a film, a sports event or an important game. These streams are, in particular, on the one hand, the file of the event in the form of an encoded data stream and on the other hand, a control message stream allowing the decryption of the data stream. The content of the data stream is encoded by regularly renewed "control words" (control words=CW). The second stream is called the ECM stream (entitlement control message) and can be formed in two different ways. According to a first method, the control words are encoded by a key, the transmission key TK, which generally pertains to the transmission system between the management centre and a security module associated with the receiver/decoder. The control word is obtained by decrypting the control messages by means of the transmission key TK.

According to a second method, the ECM stream does not directly contain the encoded control words, but contains data allowing the determining of the control words. This determining of the control words can be carried out by different operations, in particular by decryption, this decryption being able to directly lead to the control word which corresponds to the first method described above, but the decryption is equally able to lead to one piece of data which contains the control word, the latter should still have to be extracted from the piece of data.

In particular, the piece of data can contain the control word as well as a value associated with the content to be diffused, and in particular the access conditions to this content. Another operation allowing the determining of the control word can use, for instance, a one-way hashing function of this piece of data in particular.

The security operations are generally executed in a security module associated with the multimedia unit or the receiver. Such a security module can be realised in particular according to four distinct forms.

One of the forms is a microprocessor card, a smart card, or more generally an electronic module (having the form of a key, of a tag, . . . ). Such a module is generally of a removable from and connectable to the receiver. The form with electric contacts is the most used, but does not exclude a link without contact, for instance of the type ISO 14443.

A second known design is that of an integrated circuit chip placed, generally in a definitive and irremovable way, in the printed board of the receiver. An alternative is constituted by a circuit mounted on a base or connector, such as a connector of a SIM module.

In a third design, the security module is integrated into an integrated circuit chip also having another function, for instance in a descrambling module of the decoder or the microprocessor of the decoder.

In a fourth embodiment, the function of the security module is implemented in a software form only, by means of a security module processor. This software can be obfuscated within the main software of the receiver.

Given that in the four cases the function is identical, although the security level differs, we will refer to the security module in whichever way appropriate to realise its function or the form that can take this module. In the four designs described above, the security module has the means for executing a program (CPU) stored in its memory. This program allows the execution of the security operations, verifying the rights, effecting a decryption or activating a decryption module etc.

The means implemented by malicious persons for analysing the operation of such a security module can be significant and can allow these persons to realise imitations of security modules in which the necessary classified information (the keys or the serial number) have been loaded. Such a module acts as an authentic module and also has a processor and a memory. The functionalities of the security module are emulated in order to reproduce the original operation.

BRIEF DESCRIPTION OF THE INVENTION

Thus the aim of the present invention is to limit the impact of this type of emulator of security modules.

This aim is reached by a security module for the conditional access data by a digital audio/video processing unit, said conditional access data being encrypted by control words, said security module being responsible for processing security messages containing at least one cryptogram relative to a control word and one instruction relative to the control word, characterised in that it includes means to receive at least two micro programs by security messages, executable by the security module, said security module comprising means to store at least two micro programs and means to receive an instruction contained in the security message, for selecting the micro program indicated by the instruction, to execute the said micro program with at least the cryptogram as a parameter of execution, this execution allowing the calculation of the control word to be sent back to the audio/video processing unit.

According to the invention, the obtaining of the final control word is subject to the execution of a program which is not originally present in the security module and which is downloaded in the said module.

The emulators of security modules emulate the functions on the basis of another central unit (CPU) and are not able to directly execute the machine code of the micro programs.

BRIEF DESCRIPTION OF THE DRAWINGS

The invention will be better understood thanks to the following detailed description in reference to the enclosed drawings in which.

DETAILED DESCRIPTION

The aim of the present invention is to render the execution of the program code necessary to obtain the final control word. This code is not initially present in the module and is sent in a security message. Moreover, several micro programs are selectable for the production of the control word CW, the security message comprising, on the one hand, a cryptogram CTG and on the other hand, an instruction in order to select the micro program to be used.

Figure 1:
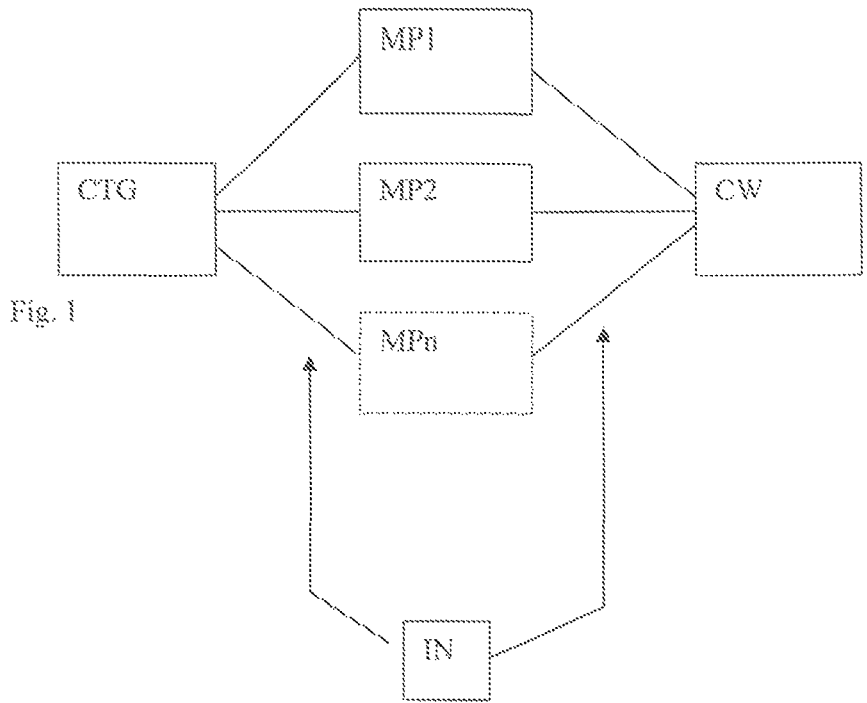
FIG. 1 shows a first embodiment of the invention.

According to a first embodiment disclosed in FIG. 1, the ECM security message contains a cryptogram, CTG, and an instruction, IN.

It is to be noted that this security message is itself secured, namely its content is encrypted by a key, which is also stored in the security module. Once decrypted, the verification data (signature, hash) allows for the verification that its content is authentic and trustworthy.

The instruction IN contained in the ECM security message is used as a selector in order to determine which micro program (MP1, MP2, MPn) must be used. This micro program is loaded in the execution memory of the processor and can be associated with other software modules. The cryptogram CTG contained in the security message is used as an entry variable of this micro program and the execution of the said micro program allows the obtaining of the control word CW.

Figure 2:
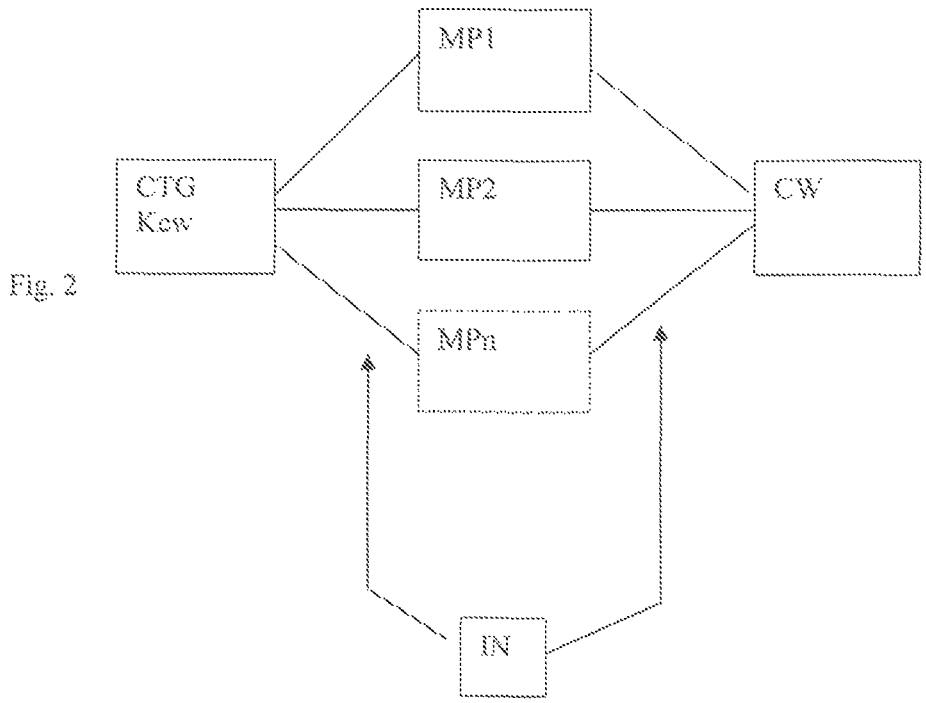
FIG. 2 shows a second embodiment of the invention including the operation of a key.

According to a second embodiment disclosed in FIG. 2, the micro program MP selected by the instruction IN receives the cryptogram CTG as a variable and receives a key Kcw contained in the security module. This key is preferably sent to the security module by another security message such as a EMM rights management message. The micro program MP is thenceforth a particular module of decryption using the key Kcw as the decryption key on the cryptogram CTG.

Figure 3:
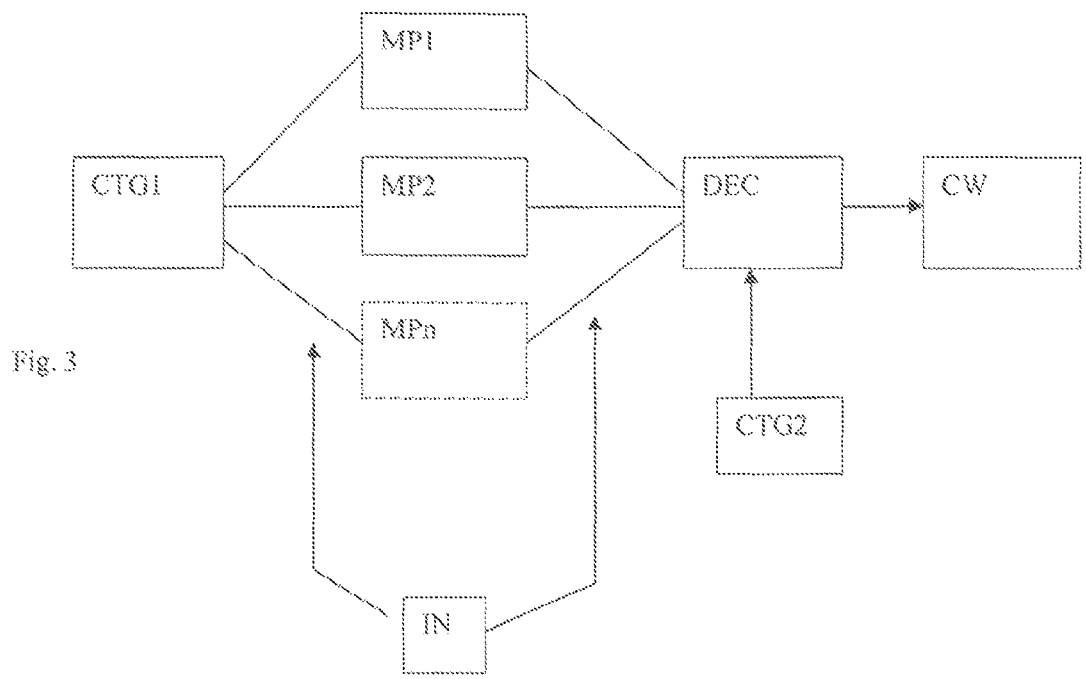
FIG. 3 shows a third embodiment of two levels, the cryptogram operating on both levels.
Figure 4:
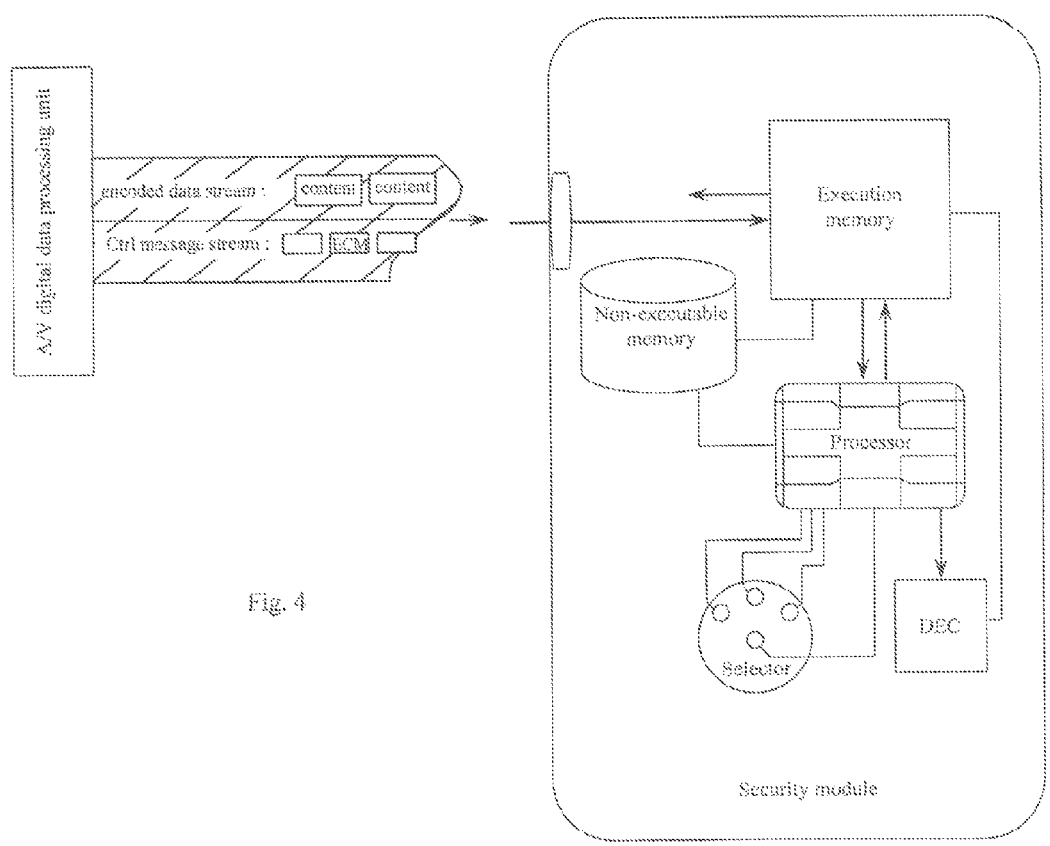
FIG. 4 shows the features of the security module of the present invention.
Figure 5:
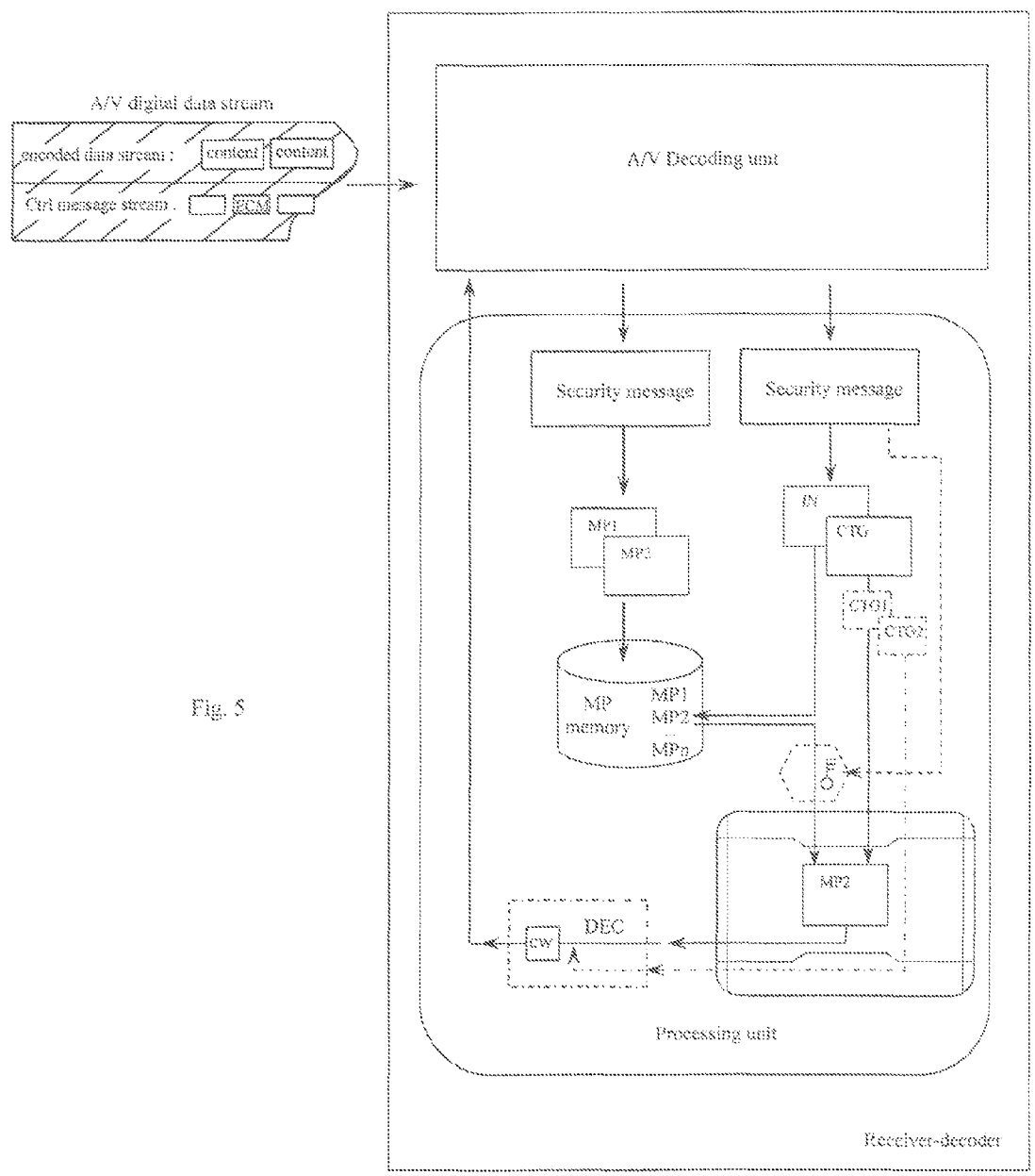
FIG. 5 shows the method steps of the present invention.
Figure 6:
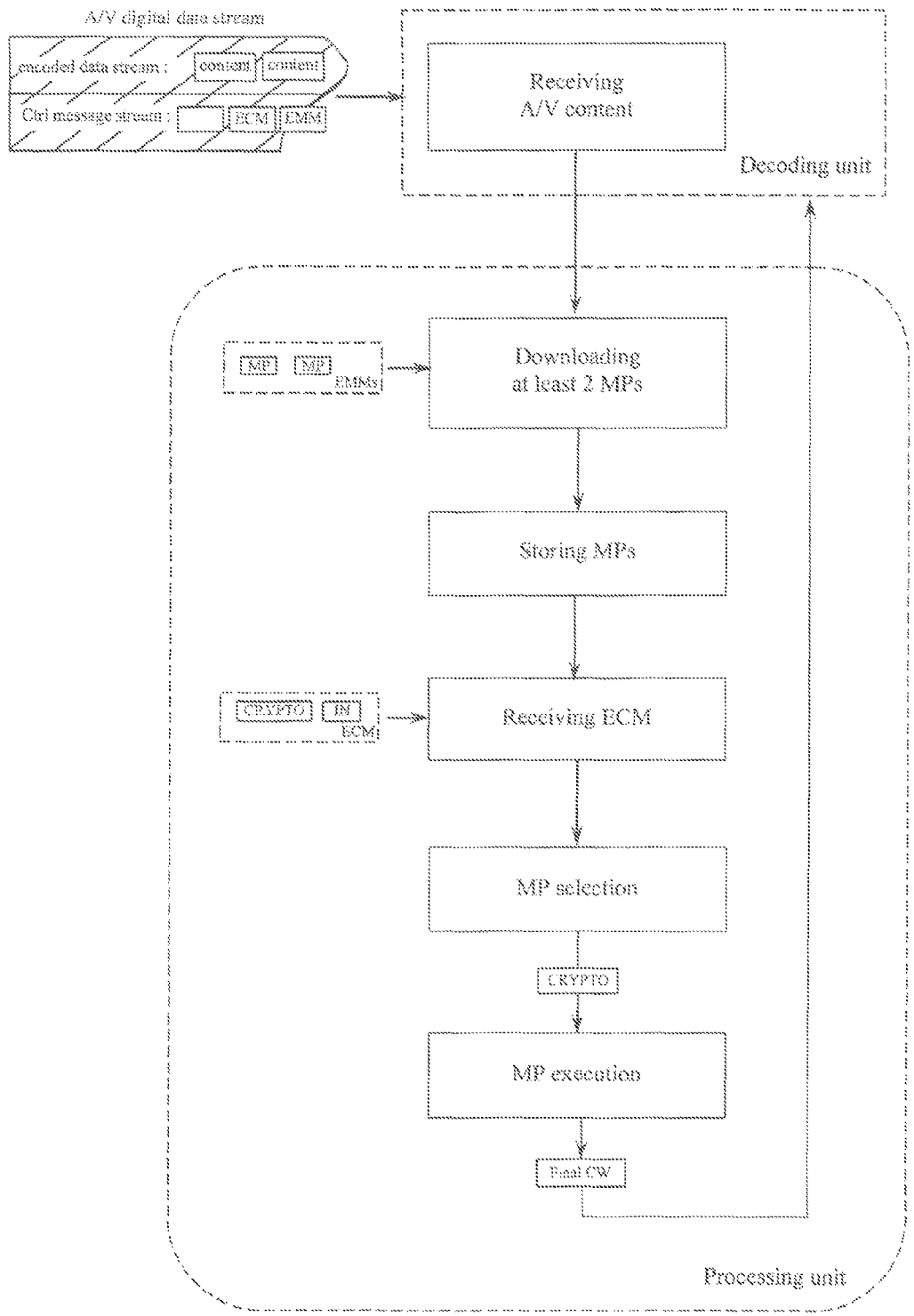
FIG. 6 is a block flow diagram showing the method steps of the present invention.

According to a third embodiment disclosed in FIG. 3, the cryptogram is divided into two parts, a first part CTG1 is used with the micro program MP selected by the instruction IN, the result of the operations executed with the micro program or a part of the micro program being transmitted to a cryptographic module DEC.

This module also receives the second part CTG2 of the cryptogram as a variable. The cryptographic operation is executed by the module DEC, on the basis of, on the one hand the result of the processing of the first part of the cryptogram CTG1 by the micro program MP and on the other hand the second part of the cryptogram CTG2, allowing to obtain the control word CW. It should be noted that the instruction IN does not intervene in the latter step.

This cryptographic module DEC can be of the type IDEA, AES, TDES or another one. The result of the micro program MP can be used as a key or as an input to this cryptographic module. In the first case, the second part of the cryptogram CTG2 is used as an input and in the second case, it is used as a key.

As indicated above, one or more micro programs MP are transmitted from a management centre to a receiver/decoder to which the security module is connected. A micro program MP can be sent in a specific security message (EMM), encrypted by an appropriate key, to the said security module. Thus only this security module will be able to access its content. According to another embodiment, the micro program is included in the same message as the cryptogram and the instruction. The processing of this message thus allows the operation of the micro program and its execution with the cryptogram as a parameter.

According to another embodiment, the micro program is encrypted by a specific key to the said micro program. The micro program is sent in a security message and, at the time of its receipt in the security module, it is stored in an encrypted form. The security message containing the cryptogram will also contain the key to decrypt the micro program.

According to a preferred embodiment of the invention, each micro program is signed in order to guarantee its authenticity. The micro program is stored in the memory of the security module in an encrypted form. Before the execution, the micro program is decrypted with a key, which is either in the secured memory of the security module, or in the security message having activated this operation. Once decrypted, it is authenticated thanks to a signature of the set of data containing the micro program. For the verification of this signature, a public key from the authority having signed the data is required, this authority having used its private and secret key to generate the signature.

The number of micro programs is at least two and may be more. They are preferably stored in a non-executable memory of the security module in an encrypted form.

Once one of the micro programs is selected by the instruction IN, this micro program is decrypted, authenticated and transferred into an executable zone of the processor of the security module. Other parts of the processor code can contribute to the execution of the micro program. It should be noted that without the operations executed by the micro program, the result of the transformation of the cryptogram cannot be obtained.

According to one embodiment, the security message contains a group of micro programs encrypted by a key. This key can either be a key memorised in the security module at the time of its initialisation, or be updated by security messages. Each micro program is encrypted by an appropriate key. At the time of the receipt of the security message, the security module extracts the micro program block and decrypts it with the corresponding key. Although the micro program block has been decrypted in the memory of the security module, each micro program remains encrypted by its own key. At the time of the arrival of a security message containing a cryptogram allowing to obtain a control word, this message will also contain the key to decrypt the micro program indicated by the instruction.

According to one particular embodiment, the security module has a processor at its disposal on which virtual software is loaded, namely instructions written in a generic language being executed by this processor via the virtualisation layer. An example of such a virtualisation layer is known as Java. The micro programs contained in the security messages are formed by instructions compatible with the virtual layer. They are executable by the virtualisation layer and can thus be executed by processors of different types, in as much as each of these processors has such a common virtualisation layer.

According to another particular embodiment of the invention, the security module includes a programmable hardware element such as that of the FPGA family known as a programmable logic module. These circuits execute a function, which is defined owing to a configuration program of the internal connections. This program allows the linking of the different internal elements of the circuit in order to form flip-flops, shift registers or any other logic functions. Thus a micro program includes such a configuration program of programmable logic, allowing the modification of the actions of this programmable logic module and the execution of particular functions on a variable, which is in this case the cryptogram.

The result obtained by the different cryptographic operations called "control word" above can again undergo modifications before being transmitted to the audio/video digital data processing unit, for example by an encryption or decryption, or even a simple mixing (XOR) with one register value. It can also be modified by the audio/video digital data processing unit, for example by a decryption in the decryption module of the audio/video stream.

According to one embodiment, the above-described method is executed by a receiver-decoder, which includes a decoding unit of the audio/video stream and a processing unit. The latter is responsible for the security operations (receiving and processing the security messages) as well as for the global management of the receiver-decoder (EPG, changing of the channel etc.). In the case when the processor at the heart of the processing unit is not the same as that for which the micro program has been written, the processing unit will emulate the execution of the security micro-code.

It is also possible, as described above, for the micro program to be in an advanced language (JAVA, C for example) and thus executable by the processing unit.

The invention claimed is:

1. A security module for an audio/video digital data processing unit for conditional access, said audio/video digital data being encrypted within an encoded data stream by control words, said security module comprising a processor programmed to:
  process a security message included within a control message stream and containing at least one cryptogram relative to a control word and one instruction relative to the control word;
  download at least two micro programs to the security module within said security messages;
  receive the security message and extract the cryptogram and the instruction;
  select one micro program among the micro programs according to a value of the instruction;
  execute the selected micro program with at least the extracted cryptogram as an entry variable of the selected micro program;
  in response to executing the selected micro program, calculate the control word; and
  transmit the calculated control word to a decoding device to decrypt the encrypted audio/video digital data; and
a memory programmed to store said at least two micro programs after being downloaded to the security module.

2. The security module according to claim 1, wherein the micro program is in an encrypted and/or authenticated form in the security message, and that it includes at least one key to decrypt and/or authenticate the micro program before its execution.

3. The security module according to claim 2, wherein the micro program is contained in a first security message, said key to decrypt said micro program being contained in a second security message.

4. The security module according to claim 1, comprising a cryptographic module wherein the cryptogram includes first and second parts, the first part acting on the micro program selected by the instruction and the second part acting on the cryptographic module receiving the result obtained by the selected micro program for calculating the control word.

5. The security module according to claim 1, wherein the security module includes a processor and virtualisation software allowing the execution of generic instructions, said micro program being formed by generic instructions.

6. The security module according to claim 1, wherein the security module includes a programmable logic module, said micro program being a configuration program of programmable logic.

7. A method for receiving an encoded audio/video data stream to be processed by a receiver decoder comprising a decoding unit and a processing unit, said data having been encrypted by control words, a cryptogram relative to said control words being received in a security message included within a control message stream, said security message also containing at least one instruction, including the following steps:
  a. downloading at least two micro programs contained in the security messages, these micro programs being executable by the processing unit;
  b. storing said micro programs in a micro program memory of said processing unit;
  c. receiving a security message containing a cryptogram relative to a control word and at least one instruction relative to the control word and extracting the cryptogram and the instruction;
  d. selecting one micro program among the micro programs according to the value of the instruction;
  e. executing said selected micro program with at least the extracted cryptogram as an entry variable of the selected micro program;
  f. in response to executing the selected micro program, calculate the control word; and
  g. transmit the calculated control word to an audio/video decoding unit to decrypt the encrypted audio/video digital data.

8. The method according to claim 7, wherein the micro program is in an encrypted and/or authenticated form in the security message, and that it includes a decryption step and/or authentication of the micro program before its execution.

9. The method according to claim 8, wherein the micro program is encrypted by an encryption key and is received by a first security message, the encryption key of said micro program being transmitted in a second security message.

10. The method according to claim 7 or 8, wherein the cryptogram includes a first and a second part, the first part acting on the micro program selected by the instruction, and the second part acting on a cryptographic module receiving the result obtained by the selected micro program for calculating the control word.

* * * * *